US008358288B2

(12) United States Patent
Kurihara et al.

(10) Patent No.: US 8,358,288 B2
(45) Date of Patent: Jan. 22, 2013

(54) TOUCH-SENSOR-PROVIDED LIQUID CRYSTAL DISPLAY DEVICE

(75) Inventors: Takashi Kurihara, Osaka (JP); Yasuhiro Kume, Osaka (JP); Takaaki Okamoto, Osaka (JP); Tomoko Nango, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 372 days.

(21) Appl. No.: 12/866,995

(22) PCT Filed: Nov. 28, 2008

(86) PCT No.: PCT/JP2008/071700
§ 371 (c)(1),
(2), (4) Date: Aug. 10, 2010

(87) PCT Pub. No.: WO2009/116205
PCT Pub. Date: Sep. 24, 2009

(65) Prior Publication Data
US 2010/0315382 A1    Dec. 16, 2010

(30) Foreign Application Priority Data

Mar. 21, 2008 (JP) .................. 2008-074065 2008

(51) Int. Cl.
G06F 3/042 (2006.01)
G09G 5/00 (2006.01)
G02B 27/14 (2006.01)

(52) U.S. Cl. ............ 345/175; 345/6; 345/156; 345/176; 345/7; 359/630

(58) Field of Classification Search .......... 345/104–105, 345/173–178, 183; 455/566; 178/18.09
See application file for complete search history.

(56) References Cited

U.S. PATENT DOCUMENTS

| 6,738,051 B2 * | 5/2004 | Boyd et al. ................ 345/176 |
| 7,724,209 B2 * | 5/2010 | Kusuno ........................ 345/6 |
| 8,072,442 B2 * | 12/2011 | Castagner et al. ............ 345/175 |
| 2005/0134751 A1 * | 6/2005 | Abileah et al. ............... 349/42 |
| 2006/0125971 A1 * | 6/2006 | Abileah et al. ............... 349/42 |

(Continued)

FOREIGN PATENT DOCUMENTS

JP    2005-275644 A    10/2005
(Continued)

OTHER PUBLICATIONS

International Search Report for PCT/JP2008/071700, mailed Mar. 3, 2009.

*Primary Examiner* — Dwayne Bost
*Assistant Examiner* — Scott Trandai
(74) *Attorney, Agent, or Firm* — Nixon & Vanderhye, P.C.

(57) ABSTRACT

The present invention relates to a touch-sensor-provided liquid crystal display device (10), the touch-sensor-provided liquid crystal display device (10) including a liquid crystal display panel (20) which includes a plurality of photo sensors (40) for detecting a touched position, and a backlight unit (90) provided on a backside of the liquid crystal display panel (20). The backlight unit (90) emits light at least part of which serves as light (L10) dedicated to sensing which is used for position detection by the plurality of photo sensors (40), and the light (L10) dedicated to sensing travels in a direction (D2) which is different from a direction (D1) toward a main viewer (V) of the liquid crystal display panel (20).

6 Claims, 12 Drawing Sheets

U.S. PATENT DOCUMENTS

| | | | |
|---|---|---|---|
| 2006/0214892 A1 | 9/2006 | Harada et al. | |
| 2006/0256093 A1 | 11/2006 | Furukawa | |
| 2007/0268206 A1 | 11/2007 | Kinoshita | |
| 2007/0297064 A1* | 12/2007 | Watanabe et al. | 359/630 |
| 2008/0018613 A1* | 1/2008 | Kim et al. | 345/173 |
| 2008/0024594 A1* | 1/2008 | Ritchey | 348/36 |
| 2008/0129684 A1* | 6/2008 | Adams et al. | 345/156 |
| 2008/0129898 A1* | 6/2008 | Moon | 349/12 |
| 2008/0192237 A1* | 8/2008 | Yamamoto | 356/73 |
| 2008/0259051 A1* | 10/2008 | Ota | 345/175 |
| 2008/0291430 A1* | 11/2008 | Nozawa | 356/73 |
| 2009/0207153 A1* | 8/2009 | Kunii et al. | 345/175 |
| 2009/0273794 A1* | 11/2009 | Ostergaard et al. | 356/614 |
| 2010/0059296 A9* | 3/2010 | Abileah et al. | 178/18.09 |
| 2010/0315382 A1* | 12/2010 | Kurihara et al. | 345/175 |
| 2011/0102723 A1* | 5/2011 | Okamoto et al. | 349/141 |
| 2011/0261300 A1* | 10/2011 | Miyazaki et al. | 349/104 |

FOREIGN PATENT DOCUMENTS

| | | |
|---|---|---|
| JP | 2006-276223 A | 10/2006 |
| JP | 2006-317682 | 11/2006 |
| JP | 2007-226045 | 9/2007 |
| JP | 2007-310628 | 11/2007 |

\* cited by examiner

F I G. 4
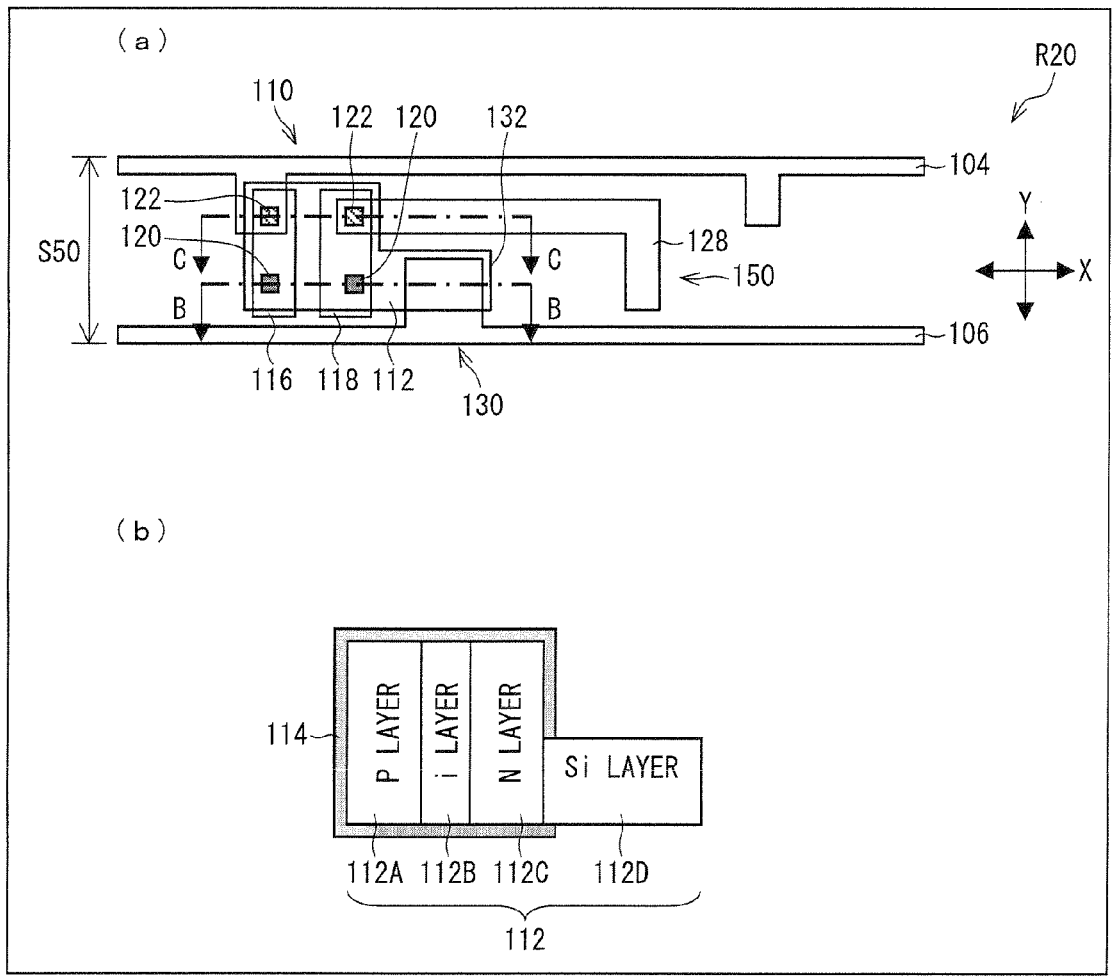

(a)

(b)

TOUCH-SENSOR-PROVIDED LIQUID CRYSTAL DISPLAY DEVICE

This application is the U.S. national phase of International Application No. PCT/JP2008/071700, filed 28 Nov. 2008, which designated the U.S. and claims priority to Japanese Patent Application No. 2008-074065, filed 21 Mar. 2008, the entire contents of each of which are hereby incorporated by reference.

TECHNICAL FIELD

The present invention relates to a touch-sensor-provided liquid crystal display device which is capable of position detection.

BACKGROUND ART

Conventionally, liquid crystal display devices with built-in touch sensors, i.e., liquid crystal display devices each of which contains a touch sensor have been widely used.

According to the liquid crystal display device with the touch sensor, for example, photo sensors for detecting light is contained in a pixel of a TFT (Thin Film Transistor) liquid crystal display panel included in the liquid crystal display device. When a viewer V of the touch-sensor-provided liquid crystal display device touches the liquid crystal display panel of the touch-sensor-provided liquid crystal display device, an amount of light received by the photo sensors is changed, and the change in the amount of light is used for detecting a position of the touch. The light received by the photo sensors can be, for example, ambient light of the touch-sensor-provided liquid crystal display device or light emitted from a backlight unit provided on a backside of the liquid crystal display panel.

Various configurations have proposed for such a touch-sensor-provided liquid crystal display device.

(Patent Literature 1)

For example, Patent Literature 1 discloses a display device integrated with a touch panel which detects a shadow generated when external light (corresponding to the ambient light) is obstructed by a touch. Patent Literature 1 further discloses a technique for improving accuracy of the detection in which technique the backlight is being turned off during the detection by sensors so that an effect of light emitted from the backlight can be reduced in detecting the shadow.

(Patent Literature 2)

Patent Literature 2 discloses a technique to detect a shadow of an object by photo sensor pixels and then obtain a center position of the shadow, etc., thereby detecting a coordinate position of the object.

Patent Literature 1
Japanese Patent Application Publication, Tokukai, No. 2006-317682 A (Publication Date: Nov. 24, 2006)
Patent Literature 2
Japanese Patent Application Publication, Tokukai, No. 2007-226045 A (Publication Date: Sep. 6, 2007)

SUMMARY OF INVENTION

However, according to the conventional touch-sensor-provided liquid crystal display device, it is difficult to detect a touch while the liquid crystal display panel is displaying a black image. The following describes this problem with reference to the attached drawings.

(Configuration of Touch-sensor-provided Liquid Crystal Display Device)

(a) and (b) of FIG. 17 are schematic diagrams illustrating conventional techniques, where position detection is carried out during a white display. (a) of FIG. 17 illustrates a state where a finger F of a viewer V does not touch a liquid crystal display panel 20. (b) of FIG. 17 illustrates a state where the finger F of the viewer V is touching the liquid crystal display panel 20.

As shown in (a) of FIG. 17, a touch-sensor-provided liquid crystal display device 10 includes the liquid crystal display panel 20 and a backlight unit 90 provided on a backside of the liquid crystal display panel 20. The liquid crystal display panel 20 includes a first substrate 32 and a second substrate 34 which face each other, and a liquid crystal layer 36 arranged between the first substrate 32 and the second substrate 34.

Moreover, according to the configuration shown in (a) of FIG. 17, a photo sensor 40 is provided on the first substrate 32. Note that, for example, a plurality of photo sensors 40 are provided, in a grid pattern, inside the liquid crystal display panel.

The backlight unit 90 provided on the backside of the liquid crystal display panel 20 emits light in a direction D1 toward the main viewer V.

(During White Display)

During a white display in which the liquid crystal display panel 20 displays a bright image such as a white image, most of the light emitted from the backlight unit 90 passes through the liquid crystal display panel 20. Accordingly, as shown in (a) of FIG. 17, transmissive light L1 for image display becomes intense.

When the finger F of the viewer V touches the liquid crystal display panel 20 during the white display, the transmissive light L1 for image display is reflected by the finger F of the viewer V, and accordingly finger reflection light L3 is generated (see (b) of FIG. 17). Further, the photo sensor 40 detects the finger reflection light L3 so as to detect, inside the liquid crystal display panel 20, a position of the touch by the finger F.

(During Black Display)

The following describes a case of a black display, in which the liquid crystal display panel 20 displays a dark image such as a black image, with reference to (a) and (b) of FIG. 18. (a) and (b) of FIG. 18 are schematic diagrams illustrating conventional techniques, where position detection is carried out during a black display. (a) of FIG. 18 illustrates a state where a finger of a viewer does not touch a liquid crystal display panel. (b) of FIG. 18 illustrates a state where the finger of the viewer is touching the liquid crystal display panel.

During the black display of the liquid crystal display panel 20, most of the light emitted from the backlight unit 90 is obstructed by the liquid crystal display panel 20. Accordingly, transmissive light L5 for image display, which light is to pass through the liquid crystal display panel 20, is less intense than the transmissive light L1 for image display during the white display shown in (a) of FIG. 17.

When the finger F of the viewer V touches the liquid crystal display panel 20 during the black display, the transmissive light L5 for image display is reflected by the finger F of the viewer V, and accordingly finger reflection light L7 is generated (see (b) of FIG. 18). The finger reflection light L7 is less intense than the transmissive light L5 for image display because the finger reflection light L7 is generated by reflection. Further, during the black display, the transmissive light L5 for image display itself which is to be reflected is not intense so much. Accordingly, the finger reflection light L7 becomes less intense than the finger reflection light L3 during the white display.

According to the configuration, the reflected light used for position detection is not intense so much. This makes it difficult for the photo sensor 40 to detect the finger reflection light L7. Consequently, it becomes difficult to carry out the position detection.

If intensity of the transmissive light L5 for image display during the black display is increased so that the photo sensor 40 can certainly detect the finger reflection light L7, a problem of deterioration in display quality occurs. For example, the black display can be grayish due to excess brightness.

The present invention is accomplished in view of the problem, and an object thereof is to provide a touch-sensor-provided liquid crystal display device which is capable of accurate position detection without deteriorating display quality even while a dark image is being displayed.

In order to attain the object, a touch-sensor-provided liquid crystal display device of the present invention includes: a liquid crystal display panel including a plurality of photo sensors for detecting a touched position; and a backlight unit provided on a backside of the liquid crystal display panel, the backlight unit emitting light at least part of which serves as light dedicated to sensing which is used for the detection of the touched position by the plurality of photo sensors, and the light dedicated to sensing traveling out from the liquid crystal display panel in a direction which is different from a direction toward a main viewer of the liquid crystal display panel.

According to the configuration, the light dedicated to sensing which is used for position detection by the photo sensors travels in the direction different from the direction toward the main viewer of the liquid crystal display panel.

As described above, the position detection is carried out by the photo sensors when the photo sensors detect change in intensity of light emitted by the backlight unit. The change occurs when the light is obstructed by a finger, etc. which is touching the liquid crystal display panel. Accordingly, during the position detection, it is necessary that light to be detected by the photo sensors is being emitted.

In a case where the liquid crystal display panel displays a dark image, etc., it is preferable that light emitted by the backlight unit is not intense so that a black image, etc. can be seen more blackly. However, in such a case where the light emitted by the backlight unit is not intense, it is difficult for the photo sensors to detect the change in intensity of the light.

Therefore, with the conventional technique, it is difficult to both (i) secure display quality in displaying a black image, etc. and (ii) achieve accurate position detection, while the liquid crystal display panel is displaying a dark image, etc.

In view of this, according to the configuration of the present invention, the light dedicated to sensing travels in the direction different from the direction toward the main viewer of the liquid crystal display panel. With the configuration, it is difficult for the main viewer to recognize the light dedicated to sensing. Therefore, even while the liquid crystal display panel is displaying a dark image, etc., the light dedicated to sensing can be emitted without deteriorating the display quality. This allows the photo sensors to easily detect the change in intensity of light, even while the liquid crystal display panel is displaying a dark image, etc.

As described above, according to the configuration of the present invention, it is possible to provide the touch-sensor-provided liquid crystal display device which enables accurate position detection without deteriorating display quality, even while a dark image is being displayed.

According to the touch-sensor-provided liquid crystal display device of the present invention, it is preferable that the liquid crystal display panel includes a first substrate and a second substrate which face each other, the first substrate and the second substrate being provided with respective light-shielding layers for controlling a direction in which the light dedicated to sensing travels; and the light dedicated to sensing which is originally emitted by the backlight unit is not shielded by the light-shielding layers, and subsequently passes through the liquid crystal display panel so as to travel out from the liquid crystal display panel in the direction different from the direction toward the main viewer of the liquid crystal display panel.

According to the touch-sensor-provided liquid crystal display device of the present invention, it is preferable that: the light-shielding layers, which are provided in the first substrate and the second substrate, respectively have slits which are openings provided in the light-shielding layers, the slits not overlapping each other as seen from a normal direction with respect to the liquid crystal display panel; and the light dedicated to sensing which is originally emitted by the backlight unit passes through the slits provided in the light-shielding layers, and subsequently passes through the liquid crystal display panel so as to travel out from the liquid crystal display panel in the direction different from the direction toward the main viewer of the liquid crystal display panel.

The configuration makes it possible to easily control, by providing the light-shielding layers on both the substrates which are provided in the liquid crystal display panel, a direction in which the light dedicated to sensing travels.

In particular, according to the configuration in which slits are openings provided in the light-shielding layers, the direction in which the light dedicated to sensing travels can be easily controlled by changing a positional relation between the slit in the first substrate and the slit in the second substrate. Further, the configuration makes it possible to easily reduce a range of the direction in which the light dedicated to sensing travels.

According to the touch-sensor-provided liquid crystal display device of the present invention, it is possible that: the liquid crystal display panel includes (i) a first substrate which is provided on a display surface side of the liquid crystal display panel and (ii) a second substrate which is provided on a side of the liquid crystal display panel on which side the backlight unit is provided, the first substrate and the second substrate being provided so as to face each other, and at least the first substrate being provided with a parallax barrier which has a striped shape and controls light emitted from the liquid crystal display panel to travel in two or more arbitrary directions; and the light dedicated to sensing is at least one of light beams traveling in the two or more arbitrary directions.

According to the touch-sensor-provided liquid crystal display device of the present invention, it is preferable that: the liquid crystal display panel is a dual view liquid crystal display panel.

According to the configuration, the light dedicated to sensing travels in at least one of directions in which light controlled by the parallax barrier travels.

The parallax barrier is a lattice-shaped light-shielding layer, such as a light-shielding layer having a striped shape, which controls light emitted from a liquid crystal display panel to travel in, for example, two or three directions. The liquid crystal display panel which includes the parallax barrier can be, for example, a so-called dual view liquid crystal display panel, a VeilView liquid crystal display panel, a 3D (Three Dimensional) liquid crystal display panel, or the like, with which emitted light is controlled to travel in two directions. Moreover, a liquid crystal display panel with which emitted light is controlled to travel in three directions can be, for example, a so-called triple view liquid crystal display panel.

In a case where the liquid crystal display panel (e.g., the dual view liquid crystal display panel) which includes the parallax barrier is used for controlling a direction in which the light dedicated to sensing travels, it is not necessary to additionally provide, inside the liquid crystal display panel, a region for transmitting the light dedicated to sensing. This makes it possible to easily control the direction in which the light dedicated to sensing travels.

According to the touch-sensor-provided liquid crystal display device of the present invention, it is possible that: the light dedicated to sensing is being emitted while the liquid crystal display panel is displaying an image.

According to the configuration, the light dedicated to sensing is being emitted in the direction different from the direction toward the main viewer of the liquid crystal display panel.

The configuration makes it possible to carry out accurate position detection without failing to detect a sudden touch, etc., while preventing deterioration of display quality.

As described above, according to the touch-sensor-provided liquid crystal display device of the present invention, the backlight unit emits light at least part of which serves as light dedicated to sensing which is used for position detection by the plurality of photo sensors, and the light dedicated to sensing travels in the direction different from the direction toward the main viewer of the liquid crystal display panel.

Therefore, it is possible to provide the touch-sensor-provided liquid crystal display device which enables accurate position detection without deteriorating display quality, even while a dark image is being displayed.

BRIEF DESCRIPTION OF DRAWINGS

FIG. 4 is a view illustrating a photo sensor region in accordance with an embodiment of the present invention: (a) is a plane view schematically illustrating a structure and (b) is a schematic view illustrating a structure of materials in a semiconductor section.

REFERENCE SIGNS LIST

Figure 1:
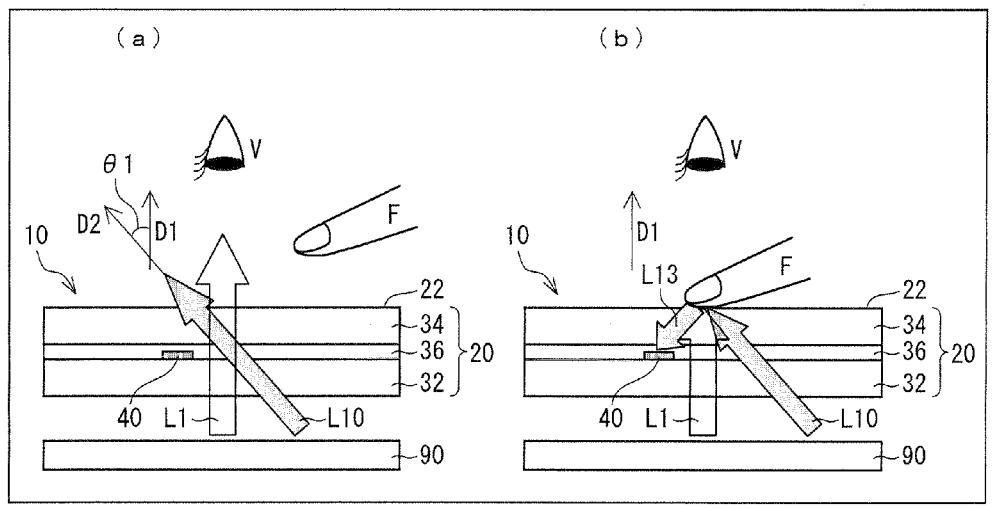
FIG. 1 is a schematic diagram illustrating a state where position detection is carried out during a white display, in accordance with an embodiment of the present invention: (a) illustrates a state where a finger of a viewer does not touch a liquid crystal display panel and (b) illustrates a state where the finger of the viewer is touching the liquid crystal display panel.

10: Touch-sensor-provided Liquid crystal display device
20: Liquid crystal display panel
22: Display surface
32: First substrate
34: Second substrate
44: Light-shielding electrode (light-shielding layer)
44S: Slit in light-shielding electrode (slit)
47: Black matrix (light-shielding layer, parallax barrier)
47S: Slit in black matrix (slit)
90: Backlight unit
L10: Transmissive light for sensing (Light dedicated to sensing)
D1: Direction toward main viewer
D2: Direction different from direction toward main viewer
V: Viewer

DESCRIPTION OF EMBODIMENTS

The following describes one embodiment of the present invention with reference to (a) and (b) of FIG. 1, etc.

(Schematic Structure)

Each of (a) and (b) of FIG. 1 is a schematic diagram illustrating a state where position detection is carried out during a white display, in accordance with the present embodiment. (a) of FIG. 1 illustrates a state where a finger F of a main viewer V does not touch a liquid crystal display panel 20. (b) of FIG. 1 illustrates a state where the finger F of the main viewer V is touching the liquid crystal display panel 20.

As shown in (a) of FIG. 1, a touch-sensor-provided liquid crystal display device 10 of the present embodiment includes the liquid crystal display panel 20 and a backlight unit 90 provided on a backside of the liquid crystal display panel 20. The liquid crystal display panel 20 includes a first substrate 32 and a second substrate 34 which face each other, and a liquid crystal layer 36 arranged between the first substrate 32 and the second substrate 34.

Moreover, a photo sensor 40 is provided on the first substrate 32. Note that, for example, a plurality of photo sensors 40 are provided inside the liquid crystal display panel 20 in a grid pattern.

The backlight unit 90 provided on the backside of the liquid crystal display panel 20 emits light in a direction D1 toward the main viewer V.

According to the touch-sensor-provided liquid crystal display device 10 of the present embodiment, the light emitted from the backlight unit 90 travels not only in the direction D1 toward the main viewer V but also in a direction other than the direction D1 toward the main viewer V. The light traveling in the direction other than the direction D1 toward the main viewer V serves as light dedicated to sensing which light is used for position detection. The following describes the configuration in cases during a white display and a black display.

(During White Display)

The white display represents a case where the liquid crystal display panel 20 displays a bright image such as a white image.

According to the touch-sensor-provided liquid crystal display device 10 of the present embodiment shown in (a) of FIG. 1 which illustrates the touch-sensor-provided liquid crystal display device 10 during the white display, the backlight unit 90 emits transmissive light L1 for image display in the direction D1 toward the main viewer V. The backlight unit 90 emits light, in addition to the transmissive light L1 for image display, in a direction D2 which is different from the direction D1 toward the main viewer V. The light emitted in the direction D2 which is different from the direction D1 toward the main viewer V is transmissive light L10 for sensing, which is used for detecting a position of a touch, not for showing an image on the liquid crystal display panel 20 to the main viewer V. That is, the transmissive light L10 for sensing serves as the light dedicated to sensing.

The transmissive light L10 for sensing travels in the direction D2 which is different from the direction D1 toward the main viewer V. This makes it difficult for the main viewer V to recognize the transmissive light L10 for sensing.

When the finger F of the viewer V touches the liquid crystal display panel 20, the transmissive light L1 for image display and the transmissive light L10 for sensing are reflected by the finger F of the viewer V, and accordingly finger reflection light L13 is generated (see (b) of FIG. 1). Further, the photo sensor 40 detects the finger reflection light L13 so as to detect, inside the liquid crystal display panel 20, a position of the touch by the finger F.

(During Black Display)

Figure 2:
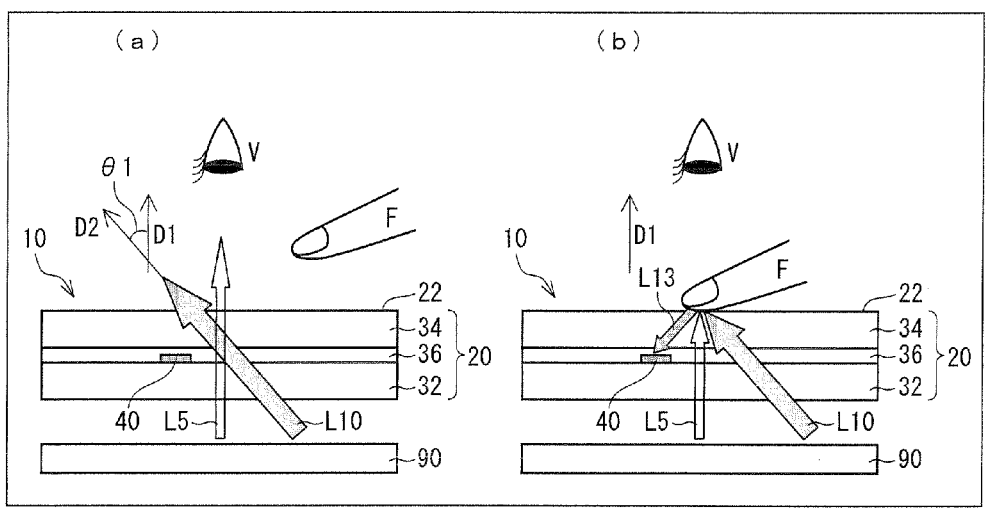
FIG. 2 is a schematic diagram illustrating a state where position detection is carried out during a black display, in accordance with an embodiment of the present invention: (a) illustrates a state where a finger of a viewer does not touch a liquid crystal display panel and (b) illustrates a state where the finger of the viewer is touching the liquid crystal display panel.

The following describes a case of the black display in which the liquid crystal display panel 20 displays a dark image such as a black image, with reference to (a) and (b) of FIG. 2.

(a) and (b) of FIG. 2 are schematic diagrams illustrating the present embodiment, where position detection is carried out during a black display. (a) of FIG. 2 illustrates a state where the finger F of the viewer V does not touch the liquid crystal display panel 20. (b) of FIG. 2 illustrates a state where the finger F of the viewer V is touching the liquid crystal display panel 20.

Transmissive light L5 for image display, which is originally emitted from the backlight unit 90 and then travels in the direction D1 toward the viewer V, is mostly obstructed by the liquid crystal display panel 20 displaying the black display. Accordingly, the transmissive light L5 for image display is less intense than the transmissive light L1 for image display during the white display shown in (a) of FIG. 1.

On the other hand, the transmissive light L10 for sensing travels in the direction D2 which is different from the direction D1 toward the main viewer V. Accordingly, the transmissive light L10 for sensing does not need to be obstructed by the liquid crystal display panel 20 during the black display. This is because the transmissive light L10 for sensing does not travel in the direction D1 toward the main viewer V, and accordingly it is difficult for the main viewer V to recognize the transmissive light L10 for sensing. Therefore, deterioration in display quality such as grayish black display due to excess brightness or degradation of contrast can hardly occur, even though the transmissive light L10 for sensing is not obstructed by the liquid crystal display 20 during the black display.

When the finger F of the viewer V touches the liquid crystal display panel 20 during the black display, the finger F of the viewer V reflects not only the transmissive light L5 for image display but also the transmissive light L10 for sensing, and accordingly finger reflection light L13 is generated (see (b) of FIG. 2).

Part of the finger reflection light L13, which part is derived from the transmissive light L5 for image display, has small intensity because the transmissive light L5 for image display itself has small intensity, as described above. However, the transmissive light L10 for sensing is intense because the transmissive light L10 for sensing is not obstructed during the black display. This allows part of the finger reflection light L13, which part is derived from the transmissive light L10 for sensing, to become intense. Accordingly, the part of the finger reflection light L13 derived from the transmissive light L10 for sensing has sufficient intensity for the photo sensor 40 to sense the light.

Consequently, the touch-sensor-provided liquid crystal display device 10 of the present embodiment makes it possible to accurately detect a touch even during a black display. Accordingly, precise position detection can be carried out.

(Transmissive Light for Sensing)

The following schematically describes the transmissive light L10 for sensing.

Figure 3:
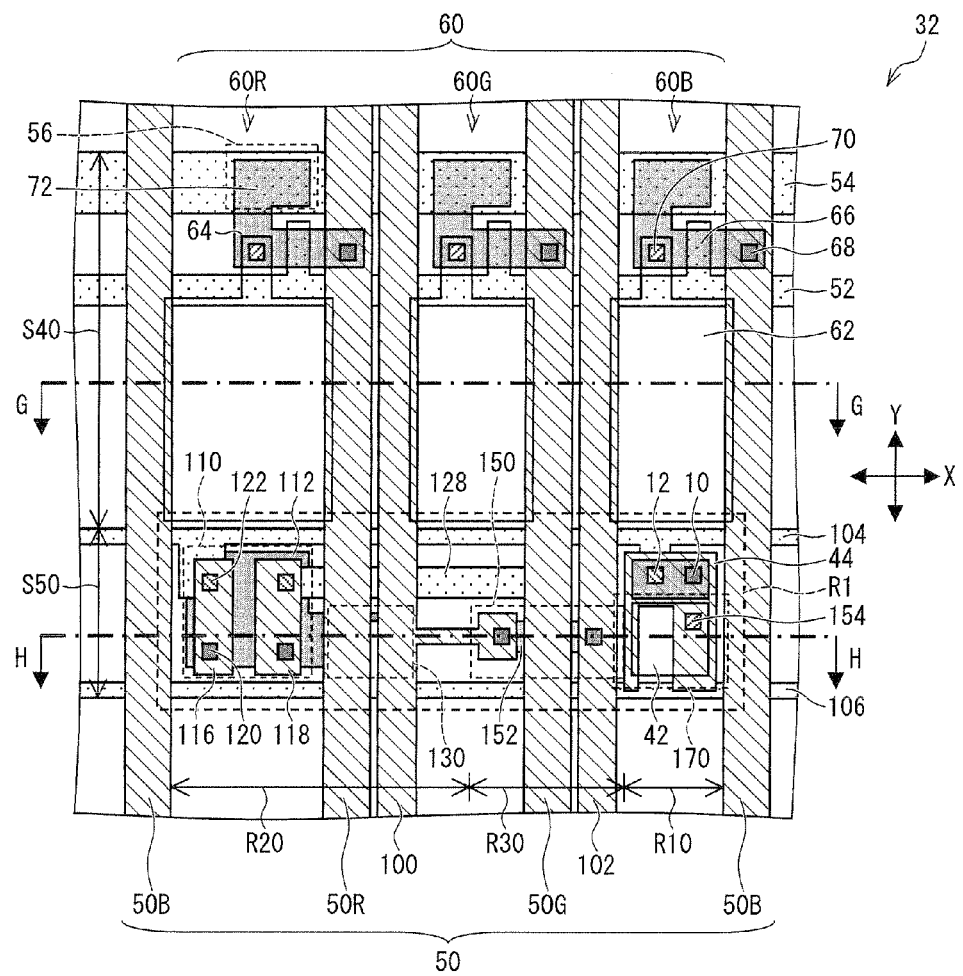
FIG. 3 is a plane view schematically illustrating structures of pixels in a touch-sensor-provided liquid crystal display device, in accordance with an embodiment of the present invention.
Figure 12:
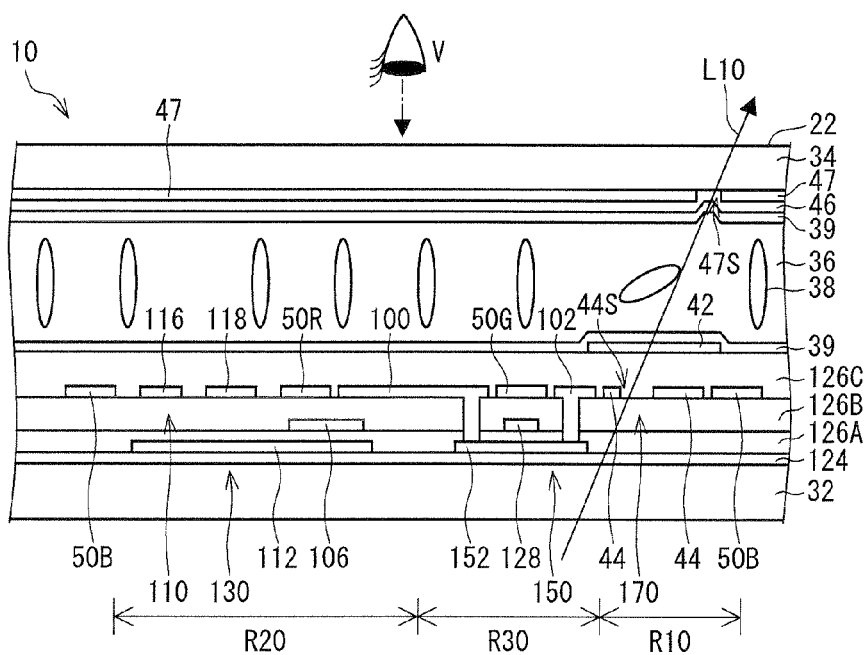
FIG. 12 is a cross-sectional view taken along the line H-H in FIG. 3.

FIG. 3 is a plane view schematically illustrating a structure of the touch-sensor-provided liquid crystal display device 10 of the present embodiment. FIG. 12 is a cross-sectional view taken along the line H-H in FIG. 3.

According to the present embodiment shown in FIG. 3, a unit of pixels 60 of three colors (i.e., a red pixel 60R, a green pixel 60G, and a blue pixel 6013) has (i) a light-transmitting region R10 for sensing which transmits the transmissive light L10 for sensing and (ii) a photo sensor region R20 in which the photo sensor (not illustrated) is provided.

Specifically, the light-transmitting region R10 for sensing is mainly provided in a region in the blue pixel 60B in which region a pixel electrode 62 for the blue pixel 60B is not provided. The photo sensor region R20 is mainly provided in a region in the red pixel 60R in which region a pixel electrode 62 for the red pixel 60R is not provided.

The following specifically describes the light-transmitting region R10 for sensing, with reference to FIG. 12.

In the light-transmitting region R10 for sensing, (i) an electrode 42 of transmissive light for sensing which consecutively remains on-condition and (ii) a light-shielding electrode 44 which controls a traveling direction of the transmissive light L10 for sensing are provided on a first substrate 32 which is provided on a TFT side.

On the other hand, a second substrate 34 serving as a color filter-side substrate is provided with a black matrix 47 in a position corresponding to the light-shielding electrode 44.

As shown in FIG. 12, the transmissive light L10 for sensing travels in accordance with positions of the light-shielding electrode 44 on the first substrate 32 and the black matrix 47 of the second substrate 34. That is, the transmissive light L10 for sensing travels in a direction in which the transmissive light L10 for sensing will not be obstructed.

Further, the electrode 42 of transmissive light for sensing consecutively remains on-condition, and accordingly the transmissive light L10 for sensing is being emitted from the light-transmitting region R10 for sensing.

(Transmissive Characteristic)

Figure 16:
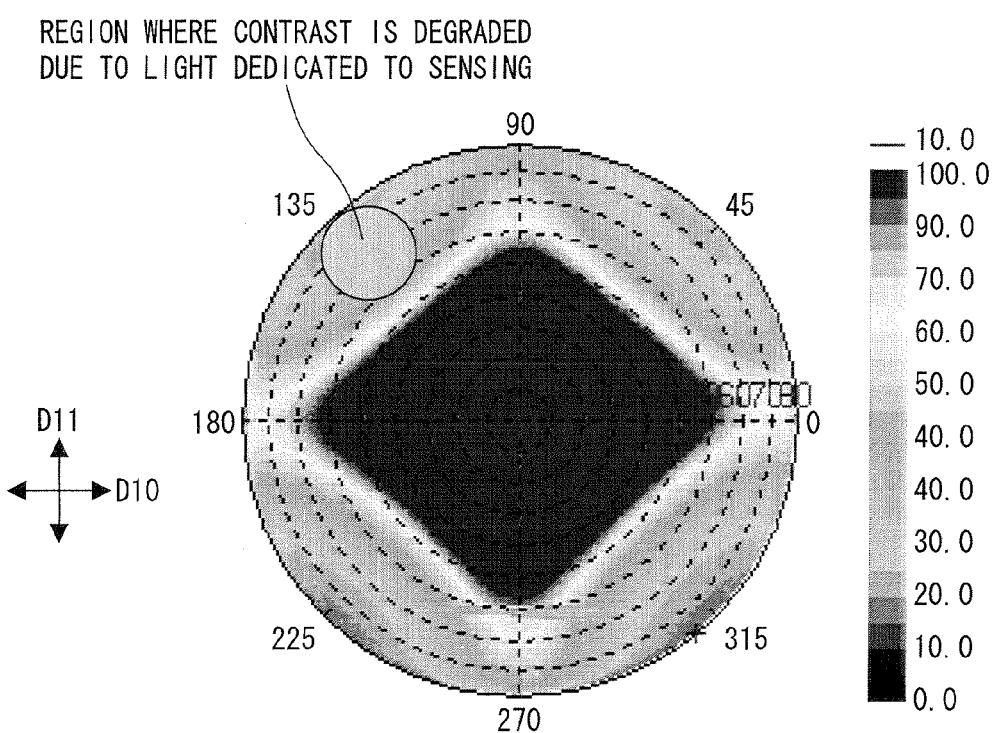
FIG. 16 is a view illustrating an image of a radiation characteristic of transmissive light for sensing, in accordance with an embodiment of the present invention.
Figure 17:
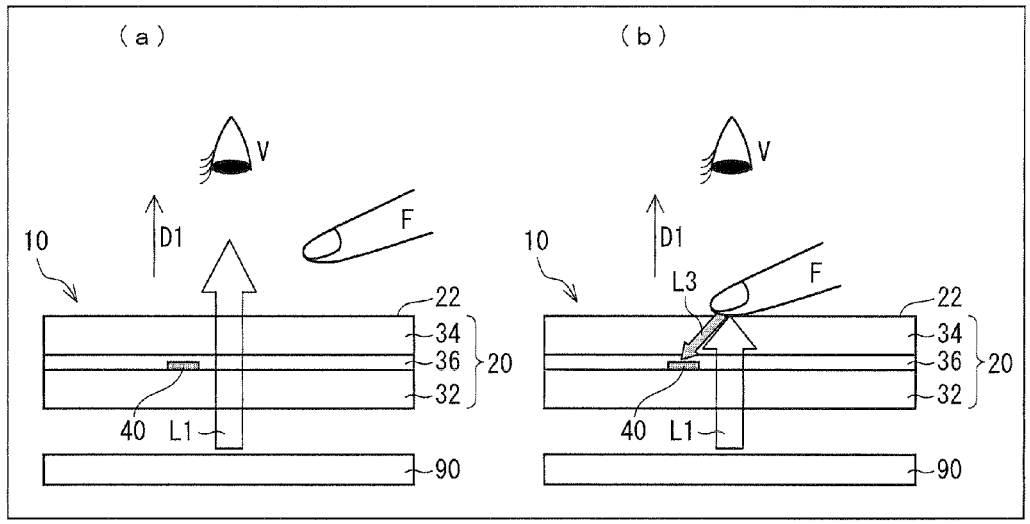
FIG. 17 is a schematic diagram illustrating a state where position detection is carried out during a white display, in accordance with a conventional technique: (a) illustrates a state where a finger of a viewer does not touch a liquid crystal display panel and (b) illustrates a state where the finger of the viewer is touching the liquid crystal display panel.
Figure 18:
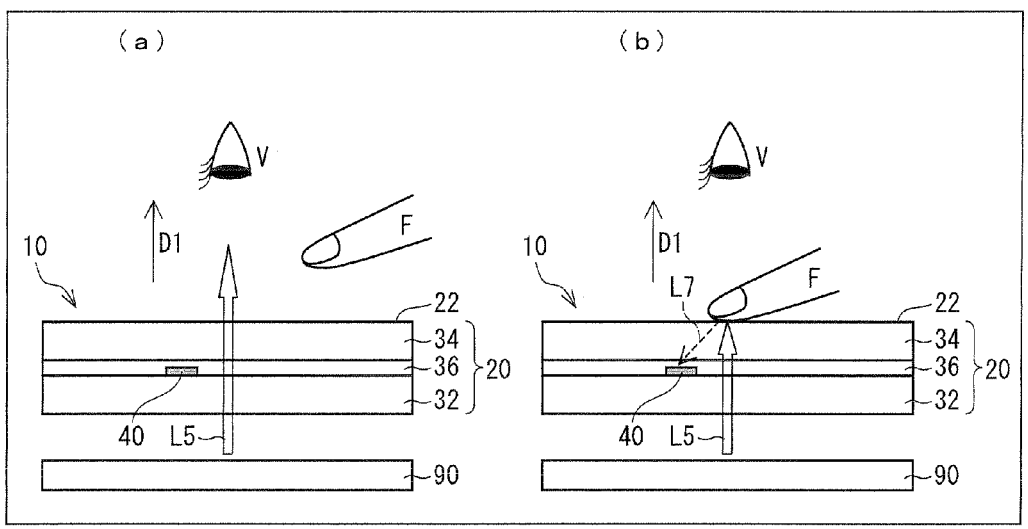
FIG. 18 is a schematic diagram illustrating a state where position detection is carried out during a black display, in accordance with conventional technique: (a) illustrates a state where a finger of a viewer does not touch a liquid crystal display panel and (b) illustrates a state where the finger of the viewer is touching the liquid crystal display panel.

The following describes, with reference to FIG. 16, a transmissive characteristic of the transmissive light L10 for sensing which passes through the light-transmitting region R10 for sensing which region has the configuration described above. FIG. 16 is a view illustrating an image of contrast, within a range of all azimuth angles ($\phi$) and polar angles between 0° and 88° ($\theta$), of the transmissive light L10 for sensing emitted from the liquid crystal display panel 20 of the present invention. That is, FIG. 16 does not indicate actual measurement values of contrast but illustrates an image of the contrast.

The following describes the all azimuth angles ($\phi$) and the polar angles ($\theta$).

Specifically, FIG. 16 shows orthogonal coordinates provided in the display surface of the liquid crystal display panel 20, where a two-way arrow D10 indicates 0 degree and 180 degrees and a two-way arrow D11 indicates 90 degrees and 270 degrees. The azimuth angle ($\phi$) is a rotation angle starting from the 0 degree point (i.e., an angle with respect to 0 degree) in a counterclockwise direction.

Moreover, the polar angle ($\theta$) represents an oblique angle with respect to a normal direction of the display surface of the liquid crystal display panel 20.

FIG. 16 illustrates contrast of the touch-sensor-provided liquid crystal display device 10, where the direction D1 toward the main viewer V is a frontward direction at the polar angle ($\theta$)=0°. Moreover, it is assumed that the direction D2, which is different from the direction D1 toward the main viewer V, in which direction D2 the transmissive light L10 for sensing travels is at an azimuth angle ($\phi$)=135 degrees and a polar angle ($\theta$)=70 degrees.

According to the touch-sensor-provided liquid crystal display device 10, as shown FIG. 16, it seems that degradation of contrast does not occur in the direction D1 toward the main viewer V (i.e., in the frontward direction at the polar angle ($\theta$)=0), even in the case where the transmissive light L10 for sensing is being emitted. Moreover, degradation of contrast seems to occur only in the direction D2. Further, it seems that display quality for the main viewer V will hardly be deteriorated even in the case where the transmissive light L10 for sensing is being emitted.

(Pixel Configuration)

The following specifically describes a pixel configuration of the touch-sensor-provided liquid crystal display device 10 of the present embodiment, with reference to a plane view and a cross-sectional view, etc.

The following describes a configuration of each of the pixels 60 with reference to FIG. 3, which is a plane view schematically illustrating the configuration of each of the pixels 60 provided in the touch-sensor-provided liquid crystal display device 10 of the present embodiment.

The pixels 60 of the present embodiment encompass pixels of three colors, i.e., a red pixel 60R, a green pixel 60G, and a blue pixel 60B, which are defined as one cycle. The pixels in the one cycle are repeatedly arranged.

Each of the pixels 60 can be divided, in a longitudinal direction (i.e., the direction indicated by the two-way arrow Y in FIG. 3), into (i) a display area S40 which mainly includes the TFT element 64 and the pixel electrode 62 and (ii) a sensing area S50 which is an area other than the display area S40.

(Display Area of Pixel)

The following describes a structure of one of the pixels 60 (R, G, and B) in the display area S40.

The first substrate 32 serving as the TFT-side substrate is provided with (i) a gate bus line 52 extending in a lateral direction (i.e., the direction indicated by the two-way arrow X in FIG. 3) and (ii) a storage capacitor line 54 which is adjacent to the gate bus line 52. Further, the first substrate 32 is provided with a source bus line 50 extending in the direction Y. That is, the source bus line 50 intersects the gate bus line 52 at right angles.

One pixel 60 is defined as a substantially oblong region divided by the source bus line 50 and the storage capacitor line 54.

Moreover, the touch-sensor-provided liquid crystal display device 10 of the present embodiment is an active matrix liquid crystal display device. Specifically, each of the pixels 60 (R, G, or B) is provided with a TFT element 64 serving as a switching element.

The TFT element 64 has a gate electrode 66 which is provided in a region overlapping the gate bus line 52 as seen in the plane view. Further, the TFT element 64 is connected to (i) the source bus line 50 via a contact 68 between a source electrode and a source bus line and a pixel electrode 62 via a contact 70 between a drain electrode and a pixel electrode. Accordingly, the pixel electrode 62 is supplied with electric charge from the source bus line 50 via the contact 68 between the source electrode and the source bus line, the TFT element 64, and the contact 70 between the drain electrode and the pixel electrode.

Moreover, the TFT element 64 has a drain electrode extension 72 which defines, with the storage capacitor line 54, a storage capacitor 56 in a region where the drain electrode extension 72 overlaps the storage capacitor line 54 as seen in the plane view.

The following describes a sensing area S50 which is an area in the pixel 60 other than the display area S40 in the longitudinal direction Y.

(Sensing Area of Pixel)

In an area of the first substrate 32 which area corresponds to the sensing area S50, wires, etc. mainly used for position detection are provided. According to the touch-sensor-provided liquid crystal display device 10 of the present embodiment, one of the pixels 60 (i.e., the red pixel 60R, the green pixel 60G, or the blue pixel 60B) has one mechanism for position detection. The following specifically describes the mechanism.

Specifically, the first substrate 32 has a VDD (power supply voltage line) 100 which extends in the longitudinal direction Y and is adjacent to a red pixel source bus line 50R (which is one of the source bus lines 50) provided for the red pixel 60R. Moreover, the first substrate 32 has a lead line 102 which is adjacent to a green pixel source bus line 50G (which is one of the source bus lines 50) provided for the green pixel 60G.

In the lateral direction X of the first substrate 32, an RST (reset line) 104 and an RWS (a column selection signal line) 106 are provided in vicinity to respective borders, which face each other, of the sensing area S50.

The RST 104, RWS 106, the VDD 100, and the lead line 102 are provided for reading out electric charge stored in a capacitor section 130 which is described later. Note that the RST 104 maintains a potential level at which a voltage can be applied between the electrode 42 of transmissive light for sensing and a counter electrode 46.

A touch sensor region R1 is defined by an oblong region surrounded by the RST 104, and the RWS 106, and two adjacent green pixel source bus lines 50G each of which are provided for a green pixel 60G.

That is, the touch sensor region R1 of the present embodiment corresponds to the sensing area S50 which is (i) provided in the red pixel 60R, the green pixel 60G, and the blue pixel 60B which are adjacently arranged and (ii) a region in the longitudinal direction Y.

(Touch Sensor Region)

The following describes the touch sensor region R1. The touch sensor region R1 can be roughly divided into a light-transmitting region R10 for sensing, a photo sensor region R20, and a transistor region R30.

(Photo Sensor Region)

The following describes the photo sensor region R20. (a) of FIG. 4 is a plane view schematically illustrating a structure of the photo sensor region R20.

As shows in (a) of FIG. 4, the photo sensor region R20 includes a photodiode section 110 and a capacitor section 130.

(Photodiode Section)

The photodiode section 110 includes, as a main component, a semiconductor section 112.

One end of the semiconductor section 112 is connected to the RST 104 and the other end of the semiconductor section 112 is connected to a transistor section 150 (which is described later) via a transistor-connecting electrode 128. Further, the semiconductor section 112 overlaps the RWS 106 as seen in the plane view so as to form the capacitor section 130.

The following describes a material structure of the semiconductor section 112 with reference to (b) of FIG. 4.

Specifically, as shown in (b) of FIG. 4, the semiconductor section 112 has a P-layer 112A and an N-layer 112C which are formed by ion-doping. Further, the semiconductor section 112 has an i-layer 112B which is arranged between the P-layer 112A and the N-layer 112C. The N-layer 112C is connected with an Si-layer 112D.

Further, the P-layer 112A, the i-layer 112B, and the N-layer 112C are surrounded by a shielding layer 114, except for the part where the N-layer 112C and the Si-layer 112D are connected to each other.

Figure 5:
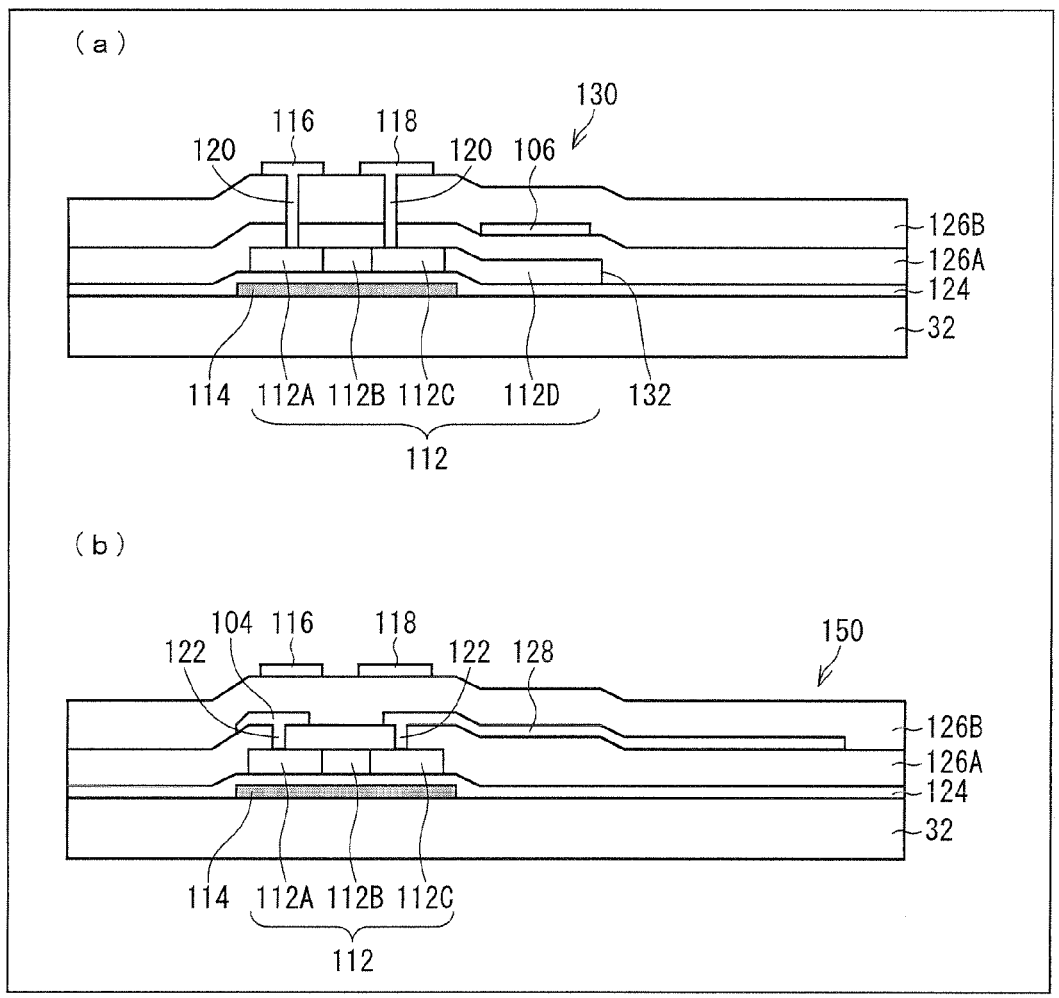
FIG. 5 is a view illustrating a photo sensor region in accordance with an embodiment of the present invention: (a) is a cross-sectional view taken along the line B-B in (a) of FIG. 4, and (b) is a cross-sectional view taken along the line C-C in (a) of FIG. 4.

The P-layer 112A is connected to a first electrode 116 via a source-Si contact 120 (see (a) of FIG. 5, which is a cross-sectional view taken along the line B-B in (a) of FIG. 4).

Similarly, the N-layer 112C is connected to a second electrode 118 via the source-Si contact 120.

Specifically, on the first substrate 32 of the present embodiment, the shielding layer 114, a base coating layer 124, the semiconductor section 112, a first insulating layer 126A, an RWS 106/an RST 104 (see (b) of FIG. 5 described later), and a second insulating layer 126B are stacked in this order.

The source-Si contact 120 penetrates the first insulating layer 126A and the second insulating layer 126B so as to connect the P-layer 112A with the first electrode 116.

Similarly, the source-Si contact 120 penetrates the first insulating layer 126A and the second insulating layer 126B so as to connect the N-layer 112C with the second electrode 118.

Note that the first electrode 116 and the second electrode 118 have functions to shield the P-layer 112A and the N-layer 112C, respectively, from external light. Moreover, the first electrode 116 and the second electrode 118 can be provided so as to partially shield the i-layer 112B from external light.

(Capacitor Section)

The Si-layer 112D overlaps the RWS 106 via the first insulating layer 126A, as seen from right above (see (a) of FIG. 5).

Further, the Si-layer 112D serves as a capacitor electrode 132, and a part of the Si-layer 112D which part overlaps the RWS 106 is defined as the capacitor section 130.

(Connection with Transistor Section)

The following describes a connection between the semiconductor section 112 and the RST 104, and a connection between the photodiode section 110 and a transistor section 150 (described later), with reference to (b) of FIG. 5 which is a cross-sectional view taken along the line C-C in (a) of FIG. 4.

Specifically, according to the present embodiment, the P-layer 112A of the semiconductor section 112 is connected to the RST 104 via a gate-Si contact 122 (see (b) of FIG. 5). Similarly, the N-layer 112C is connected to the transistor-connecting electrode 128 via the gate-Si contact 122.

More specifically, as described above, the first insulating layer 126A is provided between the semiconductor section 112 and the RST 104. Similarly, the first insulating layer 126A is provided between the semiconductor section 112 and the transistor-connecting electrode 128.

In accordance with the configuration, the gate-Si contact 122 penetrates the first insulating layer 126A so as to connect the P-layer 112A with the RST 104.

Similarly, the gate-Si contact 122 penetrates the first insulating layer 126A so as to connect the N-layer 112C with the transistor-connecting electrode 128.

The transistor-connecting electrode 128 extends from the photodiode section 110 to the transistor section 150 (i.e., extends in the lateral direction X in the pixel 60) so as to function as a gate electrode in the transistor section 150.

(Circuit Configuration)

Figure 6:
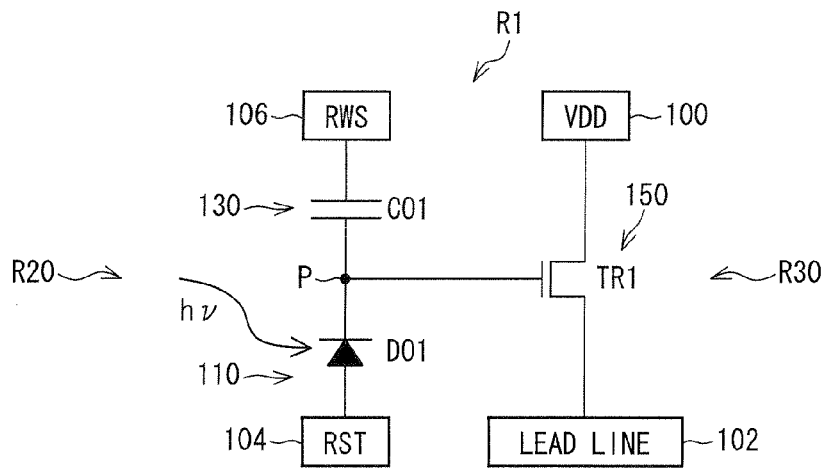
FIG. 6 is a schematic view illustrating a circuit structure of a touch sensor in accordance with an embodiment of the present invention.

The following describes a circuit structure in the touch sensor region R1 of the present embodiment, with reference to FIG. 6. FIG. 6 is a schematic view illustrating a circuit structure of a touch sensor in accordance with the present embodiment.

As shown in FIG. 6, the touch sensor region R1 includes a photo sensor region R20 and a transistor region R30.

The photo sensor region R20 includes the photodiode section 110 and the capacitor section 130. The photo diode section 110 includes a diode DO1 mainly made up of the semiconductor section 112. The capacitor section 130 includes a capacitor CO1 mainly made up of the capacitor electrode 132.

The diode DO1 is connected to the RST 104. The capacitor CO1 is connected to the RWS 106.

The photo sensor region R20 is connected to the transistor region R30 mainly via the transistor-connecting electrode 128. Specifically, the transistor region R30 includes the transistor section 150 which includes a transistor TR1 as a main component. The transistor-connecting electrode 128 is connected to the transistor TR1.

Further, the transistor TR1 is connected to the VDD 100 and the lead line 102.

(Transistor Section)

Figure 7:
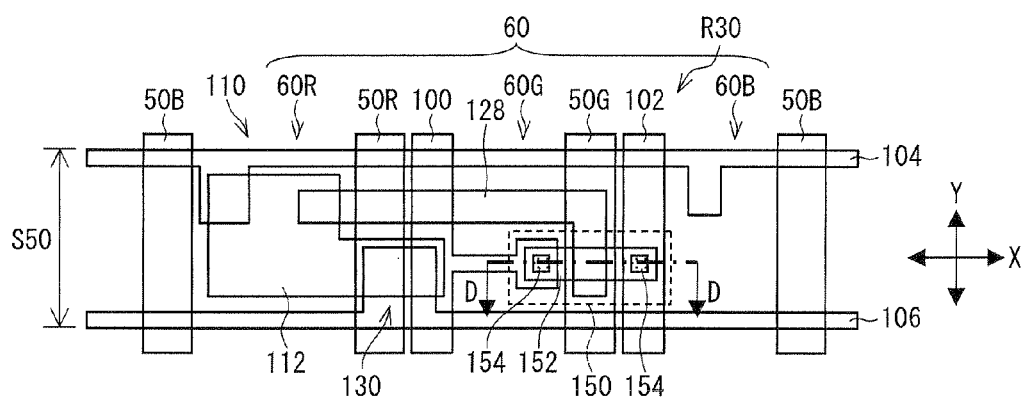
FIG. 7 is a view schematically illustrating a structure of a transistor region in accordance with an embodiment of the present invention.

The following describes the transistor section 150 with reference to FIG. 7 which schematically illustrates a structure of the transistor section 150.

As shown in FIG. 7, the transistor section 150 is provided mainly in a region of the green pixel 60G, unlike the photodiode section 110 and the capacitor section 130 which are provided mainly in a region of the red pixel 60R.

The transistor section 150 includes a transistor which includes an Si-layer 152 as a main component. The following specifically describes the configuration with reference to FIG. 8 which is a cross-sectional view taken along the line D-D in FIG. 7.

Figure 8:
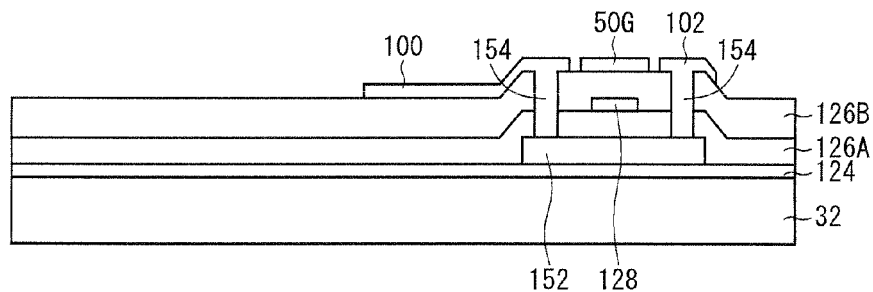
FIG. 8 is a cross-sectional view taken along the line D-D in FIG. 7.

As shown in FIG. 8, according to the transistor section 150, a base coating layer 124, an Si-layer 152, a first insulating layer 126A, a transistor-connecting electrode 128, a second insulating layer 126B, and a VDD 100/a green pixel source bus line 50G/a lead line 102 are stacked in this order on a first substrate 32.

An Si-ITO contact 154 penetrates the first insulating layer 126A and the second insulating layer 126B so as to connect the Si-layer 152 with the VDD 100.

Similarly, the Si-ITO contact 154 penetrates the first insulating layer 126A and the second insulating layer 126B so as to connect the Si-layer 152 with the lead line 102.

(Sensing Light Section)

Figure 9:
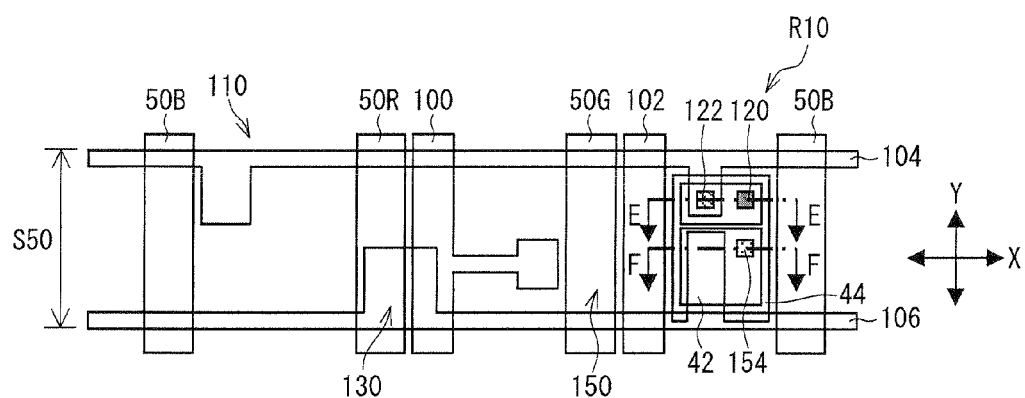
FIG. 9 is a view schematically illustrating a structure of a light-transmitting region for sensing, in accordance with an embodiment of the present invention.

The following describes a sensing light section 170 of the present embodiment, with reference to FIG. 9. FIG. 9 is a view schematically illustrating a structure of the sensing light section 170.

As shown in FIG. 9, the sensing light section 170 is provided mainly in the region of the green pixel 60G.

The sensing light section 170 includes a light shielding electrode 44 which serves as a light shielding layer for controlling a direction of emitted light.

Figure 10:
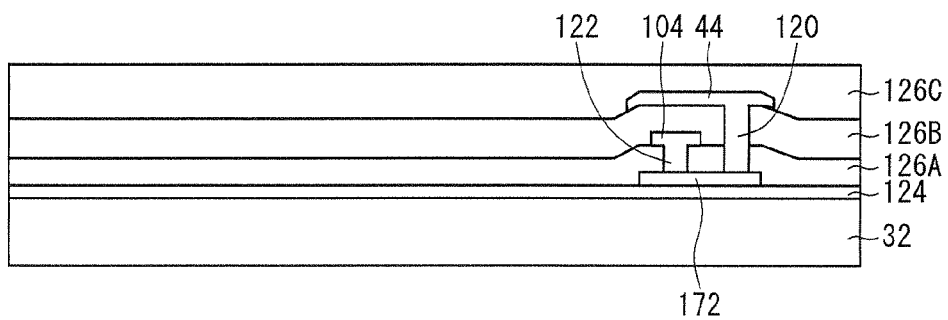
FIG. 10 is a view illustrating a light-transmitting region for sensing, in accordance with the embodiment of the present invention: (a) is a cross-sectional view taken along the line E-E in FIG. 9 and (b) is a cross-sectional view taken along the line F-F in FIG. 9.
Figure 10:
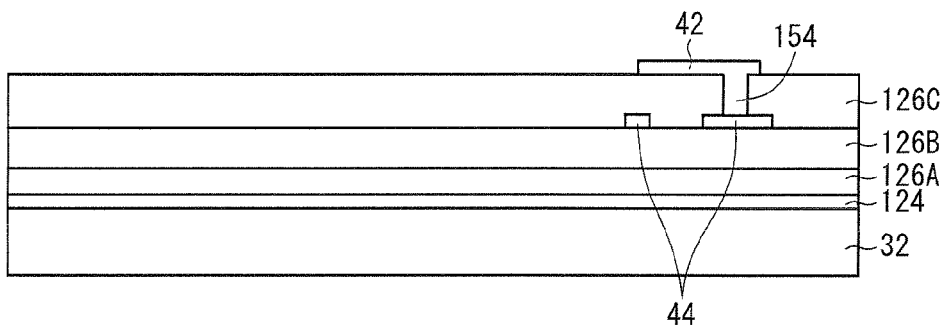

The following specifically describes the configuration with reference to (a) of FIG. 10 which is a cross-sectional view taken along the line E-E in FIG. 9 and (b) of FIG. 10 which is a cross-sectional view taken along the line F-F in FIG. 9.

As shown in (a) and (b) of FIG. 10, according to the sensing light section 170, a base coating layer 124, an Si-layer 172, a first insulating layer 126A, an RST 104, a second insulating layer 126B, a light shielding electrode 44 made up of an electrode layer, a third insulating layer 126C, and an electrode 42 of transmissive light for sensing made up of an ITO layer are stacked in this order on a first substrate 32.

As shown in (a) of FIG. 10, the first insulating layer 126A is arranged between the Si-layer 172 and the RST 104, and a gate-Si contact 122 connects the Si-layer 172 with the RST 104.

Moreover, the first insulating layer 126A and the second insulating layer 126B are arranged between the Si-layer 172 and the light shielding electrode 44, and a source-Si contact 120 connects the Si-layer 172 with the light shielding electrode 44.

As shown in (b) of FIG. 10, the third insulating layer 126C is arranged between the light shielding electrode 44 and the electrode 42 of transmissive light for sensing, and a Si-ITO contact 154 connects the light shielding electrode 44 with the electrode 42 of transmissive light for sensing.

(Emitted Light)

Figure 11:
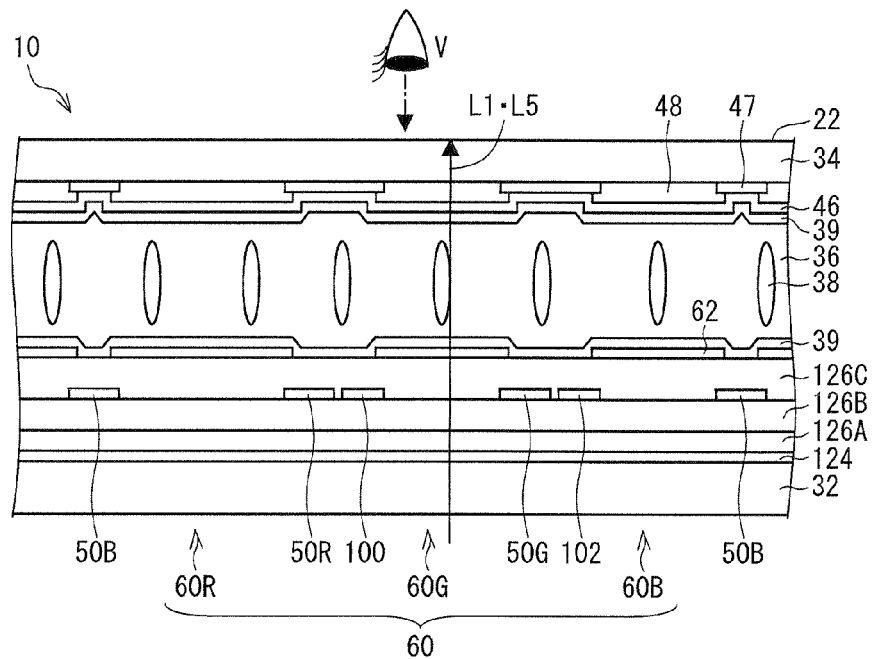
FIG. 11 is a cross-sectional view taken along the line G-G in FIG. 3.

The following describes a relation between alignment, etc. of liquid crystal molecules 38 and emitted light of the touch-sensor-provided liquid crystal display device 10 of the present embodiment. The relation is discussed with reference to a display area S40 and a sensing area S50 which are arranged in the longitudinal direction Y in the pixel 60. FIG. 11 is a cross-sectional view taken along the line G-G in FIG. 3 which is a plane view illustrating a schematic structure of the pixel 60. FIG. 12 is a cross-sectional view taken along the line H-H in FIG. 3.

(Display Area)

The following describes the display area S40 with reference to FIG. 11. Note that, regarding the configuration of the touch-sensor-provided liquid crystal display device 10, explanations for the components which are already described above are omitted.

According to the touch-sensor-provided liquid crystal display device 10 of the present embodiment as shown in FIG. 11, a liquid crystal layer 36 containing liquid crystal molecules 38 is arranged between a first substrate 32 and a second substrate 34.

Moreover, alignment films 39 are provided in respective sections (i) between the liquid crystal layer 36 and the first substrate 32 and (ii) between the liquid crystal layer 36 and the second substrate 34.

Moreover, a pixel electrode 62 is provided, for each of the pixels 60, between the first substrate 32 and the alignment film 39.

A black matrix 47 and a color filter 48 are provided, for each of the pixels 60, between the second substrate 34 and the alignment film 39. Further, a counter electrode 46 is provided between (i) the alignment film 39 and (ii) the black matrixes 47 and color filters 48.

In a case where a main viewer V of the touch-sensor-provided liquid crystal display device 10 is positioned in a normal direction with respect to the liquid crystal display panel 20 included in the touch-sensor-provided liquid crystal display device 10, transmissive light L1 or L5 for image display is emitted mainly in a normal direction with respect to a display surface 22 of the liquid crystal display panel 20.

(Sensing Area)

The following describes the sensing area S50 with reference to FIG. 12.

As shown in FIG. 12, an electrode 42 of transmissive light for sensing is provided between the first substrate 32 and the alignment film 39 in the light-transmitting region R10 for sensing which transmits the transmissive light L10 for sensing. The electrode 42 of transmissive light for sensing is used, in the light-transmitting region R10 for sensing, for applying a voltage to the liquid crystal molecules 38 which are provided between the electrode 42 of transmissive light for sensing and the counter electrode 46 provided on the second substrate 34.

According to the configuration, a voltage is applied to the liquid crystal molecules 38 in the light-transmitting region R10 for sensing, separately from the pixel electrodes 62 in the display area S40. Accordingly, the liquid crystal molecules 38 in the light-transmitting region R10 for sensing can be driven independently. This makes it possible to control whether or not to emit the transmissive light L10 for sensing.

Moreover, the first substrate 32 in the light-transmitting region R10 for sensing is provided with the light-shielding electrode 44 which has a slit-like shape. The black matrix 47 covers almost the whole surface of the second substrate 34, except for a slit provided in the black matrix 47 in the light-transmitting region R10 for sensing. In other words, the light-shielding electrode 44 and the black matrix 47, which serve as light-shielding layers, respectively have a slit 44S and a slit 47S which are openings provided in the light-shielding electrode 44 and the black matrix 47.

Note that no color filter is provided on the second substrate 34 in the sensing area S50 because it is unnecessary to display an image in the sensing area S50.

However, a color filter can be provided on the second substrate 34 in the sensing area S50. The use of the color filter makes it possible to adjust intensity of light dedicated to sensing.

In some cases, some of the light dedicated to sensing can leak in the viewing direction. In view of the cases, it is preferable to control intensity of the light dedicated to sensing to the minimum necessary intensity. Such a control can be carried out with the use of the color filter.

A backlight unit 90 (not illustrated) provided on a backside of the liquid crystal display panel 20 emits light which travels along a light path between the slit 44S in the light-shielding electrode 44 and the slit 47S in the black matrix 47. Consequently, according to the configuration illustrated in FIG. 12, the transmissive light L10 for sensing is emitted at an angle which is inclined with respect to the normal direction of the display surface 22 of the liquid crystal display panel 20.

Therefore, the main viewer V who is positioned in the normal direction of the display surface 22 of the liquid crystal display panel 20 will not recognize the transmissive light L10 for sensing.

According to the configuration, the main viewer V hardly recognize the transmissive light L20 for sensing even while the liquid crystal display panel 20 is displaying a dark image. This makes it possible, for example, to prevent deterioration in display quality such as degradation of contrast or excess brightness, and accordingly accurate position detection can be carried out.

(Readout from Photodiode Section and Capacitor Section)

The following describes an example of readout of electric charge in the photodiode section 110 and the capacitor section 130.

As described above, the readout of the electric charge is carried out mainly with the use of the RST 104, the RWS 106, the VDD 100, and the lead line 102.

The following describes preliminary stages of readout.

Firstly, the RWS 106 is set to 0 V and the RST 104 is set to −7 V.

Then, the electric potential of the RST 104 is increased to 0 V. This allows electrodes across a capacitor CO1 to have approximately 0 V, and accordingly electric charge of the capacitor CO1 is cleared.

Subsequently, the electric potential of the RST 104 is decreased to −7 V. Note that a diode DO1 is provided between the capacitor CO1 and the RST 104 (see FIG. 6 which is an equivalent circuit diagram of the touch sensor). Therefore, an electric potential at a point (a point P in FIG. 6) which corresponds to a gate electrode of the transistor TR1 (hereinafter, referred to as TR1 gate potential) remains at approximately 0 V.

Electric potentials of the RWS 106 and the RST 104 are maintained in the state until a readout frame.

When the photo sensor region 20 made up of the photodiode section 110 and the capacitor section 130 receives light during the state described above, a current is supplied to the capacitor CO1 via the diode DO1, and this causes electric charge of the capacitor CO1 to be decreased. Accordingly, the TR1 gate potential is decreased. As described above, the TR1 gate potential can be altered so as to correspond to intensity of light received by the photo sensor region 20.

The following describes how the readout is carried out.

When the readout is carried out, first, the electric potential of the RWS 106 is increased to +15 V. At this time, the TR1 gate potential is increased in accordance with the increase of the electric potential of the RWS 106. The TR1 gate potential can be increased to, for example, approximately 5 V to 9 V in accordance with the increase of the electric potential of the RWS 106.

The transistor TR1 has a gate electrode whose electric potential is the TR1 gate potential. Both ends of a channel of the transistor TR1 are connected to the VDD 100 and the lead line 102, respectively.

According to the configuration, the lead line 102 passes a current corresponding to the TR1 gate potential.

After measuring the current which corresponds to the TR1 gate potential and is passed through the lead line 102, the electric potential of the RWS 106 is decreased to 0 V.

With the configuration, intensity of light received by the photo sensor region 20 can be readout by repeatedly carrying out the processes.

Note that, according to the configuration shown in FIG. 3, etc., it is assumed that the liquid crystal display panel 20 is a liquid crystal display panel of a normally black type in which a small amount of voltage is applied to liquid crystal molecules 38 in a pixel section (display area S40), which corresponds to the pixel 60 for displaying. As described above, even while a dark image is being displayed, the electrode 42 of transmissive light for sensing, which is connected to the RST 104, in the sensing light section 170 remains at a decreased electric potential of, for example, −7 V in most of time except for during the readout. This makes it possible to apply a sufficient voltage, for driving the liquid crystal molecules 38, between the electrode 42 of transmissive light for sensing and the counter electrode 46.

(Transmissive Light for Sensing)

As described above, according to the touch-sensor-provided liquid crystal display device 10 of the present embodiment, it is sufficient that the transmissive light D10 for sensing is designed to travel in the direction D2 which is different from the direction D1 toward the main viewer V who recognizes a displayed image.

According to the configuration described with reference to FIG. 12, etc., the transmissive light L10 for sensing travels in a direction, which is indicated by an arrow in FIG. 12, due to the two light shielding layers (i.e., the black matrix 47 and the light-shielding electrode 44). Specifically, the transmissive light L10 for sensing travels in a direction inclined with respect to an approximately normal direction of the liquid crystal display panel 20. That is, the transmissive light L10 for sensing is emitted in a direction which is different from the approximately normal direction in which the viewer V generally recognizes an image.

However, the direction in which the transmissive light L10 for sensing is emitted is not limited to the direction described above.

The following describes specific examples of use of the touch-sensor-provided liquid crystal display device 10 of the present embodiment, with reference to two cases where the main viewer V views the touch-sensor-provided liquid crystal display device 10 from different positions.

Example of Use 1

Figure 13:
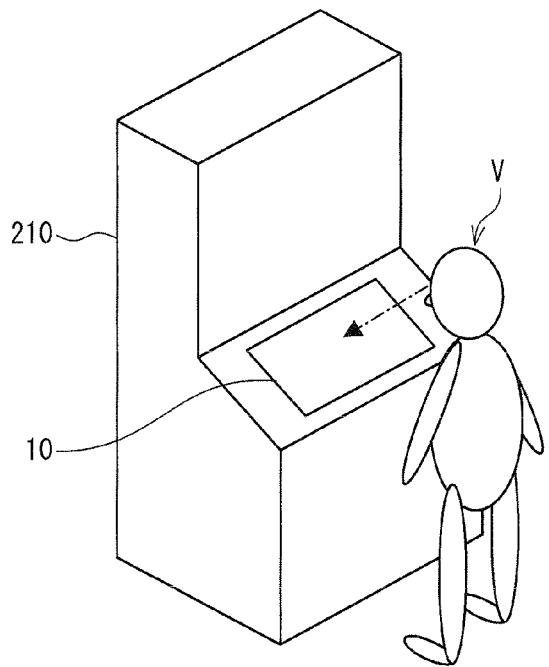
FIG. 13 is a view illustrating an example of use of the touch-sensor-provided liquid crystal display device of the present invention: (a) is a perspective view and (b) is a lateral view.
Figure 13:
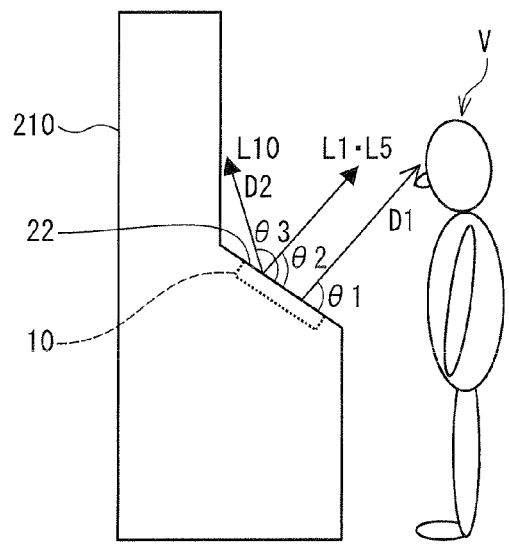

The following describes one example of use of the touch-sensor-provided liquid crystal display device 10 of the present embodiment, with reference to (a) and (b) of FIG. 13. (a) of FIG. 13 is a perspective view illustrating an example of use of the touch-sensor-provided liquid crystal display device 10. (b) of FIG. 13 is a lateral view corresponding to (a) of FIG. 13.

According to the example of use shown in (a) and (b) of FIG. 13, the touch-sensor-provided liquid crystal display device 10 of the present embodiment is incorporated, as an operating section, in an automated teller machine 210.

A user of the automated teller machine 210, i.e., the main viewer V of the touch-sensor-provided liquid crystal display device 10 is positioned in an approximately normal direction with respect to the display surface 22 of the touch-sensor-provided liquid crystal display device 10 (see (b) of FIG. 13). Accordingly, an angle θ1 formed by the direction D1 toward the main viewer V and the display surface 22 is approximately 90 degrees.

Therefore, according to the present example of use, the transmissive light L1 or L5 for image display is emitted in a direction in parallel with the direction D1. That is, the transmissive light L1 or L5 for image display is emitted so that an angle θ2 formed by the transmissive light L1 or L5 and the display surface 22 becomes 90 degrees.

On the other hand, the transmissive light L10 for sensing may be emitted in the direction D2 which is different from the direction D1 toward the main viewer V. That is, the transmissive light L10 for sensing may be emitted so that an angle θ3 formed by the transmissive light L10 for sensing and the display surface 22 becomes, for example, 135 degrees.

Example of Use 2

Figure 14:
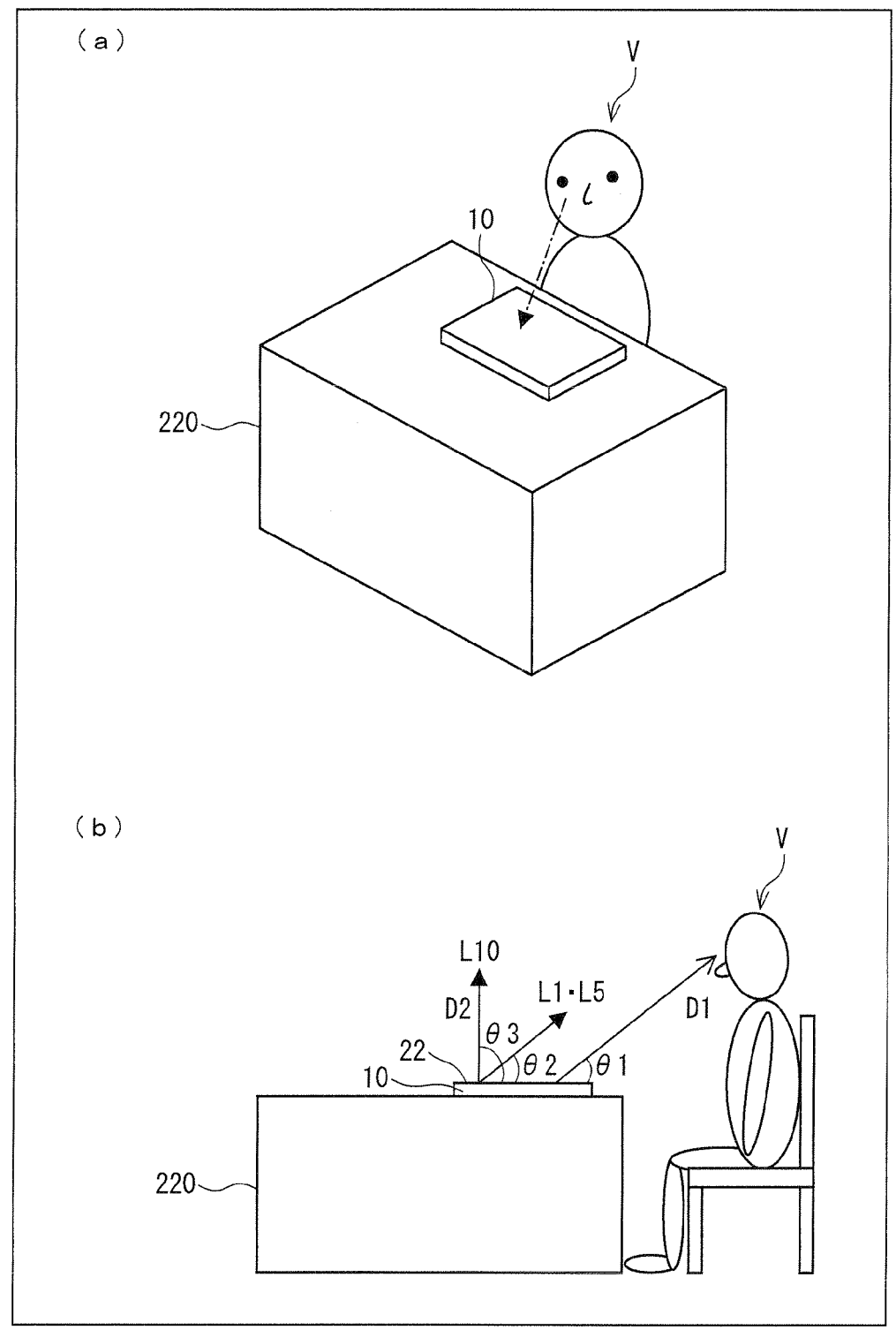
FIG. 14 is a view illustrating an example of use of the touch-sensor-provided liquid crystal display device of the present invention: (a) is a perspective view and (b) is a lateral view.

The following describes another example of use of the touch-sensor-provided liquid crystal display device 10 of the present embodiment, with reference to (a) and (b) of FIG. 14. (a) of FIG. 14 is a perspective view illustrating another example of use of the touch-sensor-provided liquid crystal display device. (b) of FIG. 14 is a lateral view corresponding to (a) of FIG. 14.

According to the example of use shown in (a) and (b) of FIG. 14, the touch-sensor-provided liquid crystal display device 10 of the present embodiment is used as an operation terminal 222 placed on a desk 220.

According to the configuration, a user of the operation terminal 222, i.e., the main viewer V of the touch-sensor-provided liquid crystal display device 10 is positioned in a direction which is different from a normal direction with respect to the display surface 22 of the touch-sensor-provided liquid crystal display device 10, unlike the example of use shown in (a) and (b) of FIG. 13. Specifically, the angle θ1 formed by the direction D1 toward the main viewer V and the display surface 22 is not 90 degrees but is, for example, 45 degrees.

Therefore, according to the present example of use, the transmissive light L1 or L5 for image display is emitted in a direction in parallel with the direction D1. That is, the transmissive light L1 or L5 for image display is emitted so that the angle θ2 formed by the transmissive light L1 or L5 and the display surface 22 becomes, for example, 45 degrees.

On the other hand, the transmissive light L10 for sensing is emitted in the direction D2 which is different from the direction D1 toward the main viewer V. That is, the transmissive light L10 for sensing is emitted so that the angle θ3 formed by the transmissive light L10 for sensing and the display surface 22 becomes, for example, 90 degrees.

As described above, according to the touch-sensor-provided liquid crystal display device 10 of the present embodiment, emitting directions of the transmissive light L1 or L5 for image display and the transmissive light L10 for sensing can be variously changed in accordance with usage. An emitting direction of light dedicated to sensing can be controlled, as described above for example, by modifying shapes of the light-shielding layers sandwiching the liquid crystal layer in the sensing area S50.

(Dual View Liquid Crystal Display Panel)

Note that a configuration for emitting a plurality of lights (e.g., the transmissive light L1 or L5 for image display and the transmissive light L10 for sensing) in different directions is not limited to the configuration described above. For example, a parallax barrier can be used instead of the above described configuration in which the light-shielding layers and the slits are provided inside the liquid crystal display panel. The parallax barrier is a member which has, for example, a slit-shaped structure provided, for controlling a light path, in the liquid crystal display panel.

Specifically, for example, it would be possible to use a so-called dual view liquid crystal display panel, a VeilView liquid crystal display panel, a triple view liquid crystal display pane, a 3D (Three Dimensional) liquid crystal display panel, or the like, each of which is capable of displaying different images in different directions.

Figure 15:
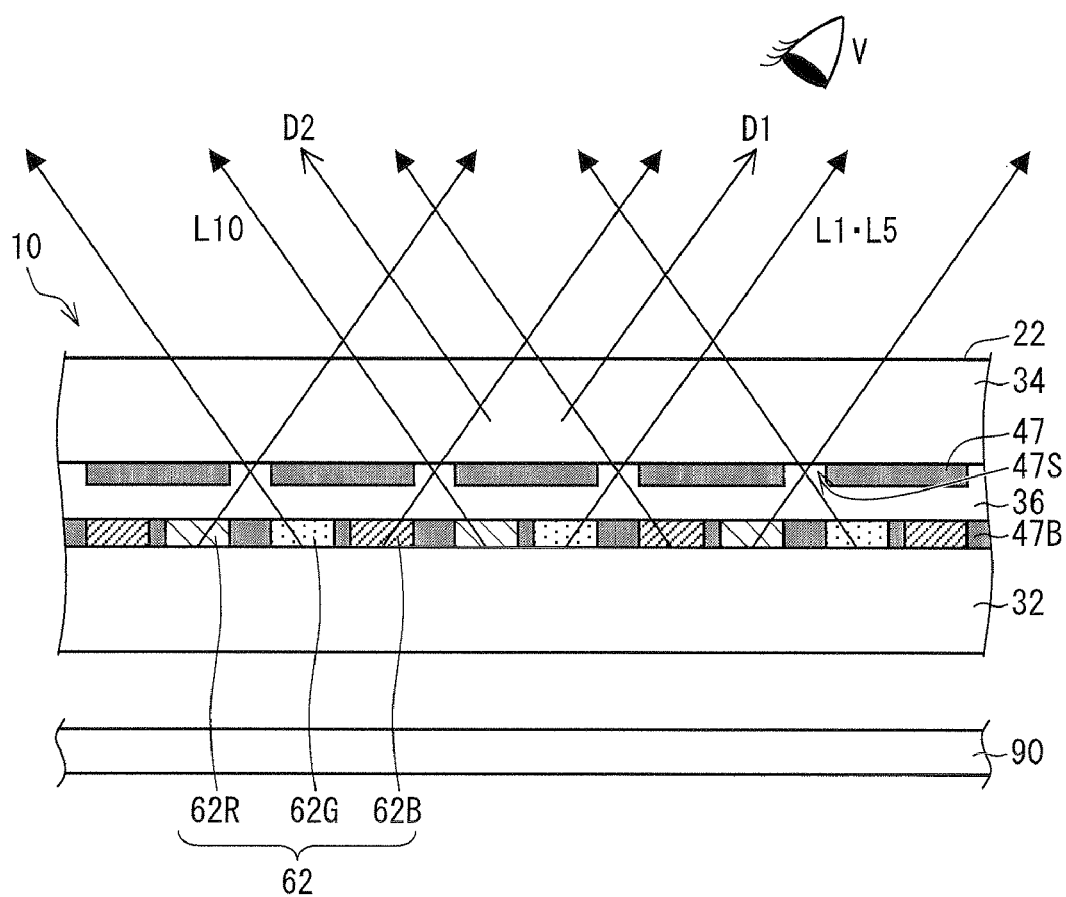
FIG. 15 is a view illustrating another configuration of the touch-sensor-provided liquid crystal display device of the present invention.

The following describes a configuration example in which the dual view liquid crystal display panel is used, with reference to FIG. 15 which illustrates another configuration example of the touch-sensor-provided liquid crystal display device 10.

According to a dual view liquid crystal display panel 20, a second substrate 34 is provided with a black matrix 47, as the parallax barrier, which is provided at a position corresponding to each of pixel electrodes 62 (see FIG. 15).

A first substrate 32 is provided with black matrixes 47*b* instead of pixel electrodes 62. The black matrixes 47*b* are provided at positions corresponding to the slits 47S formed in the black matrix 47 provided on the second substrate 34.

With the configuration, a backlight unit 90 provided on a backside of the liquid crystal display panel 20 emits lights which travel mainly in two directions, respectively (see FIG. 15).

In a case where one of the two directions is set to a direction D1 toward a main viewer V of the liquid crystal display panel 20, light which travels in the direction D1 serves as transmissive lights L1 or L5 for image display.

Light which is emitted in the other one of the two directions travels in a direction D2 which is different from the direction D1 toward the main viewer V. From this, the light traveling in the direction D2 cannot be recognized by the main viewer V. Accordingly, the light traveling in the direction D2 can be used as transmissive light L10 for sensing. This makes it possible to achieve an effect similar to that of the touch-sensor-provided liquid crystal display device 10 which is described above with reference to FIG. 3, etc.

The configuration using the parallax barrier provides another advantageous feature that no additional region is required for emitting the transmissive light L10 for sensing, other than a region for displaying an image.

According to the configuration described above, the touch sensor regions R1, each of which includes a unit of three pixels 60R, 60G, and 60B, are arranged in a matrix manner. However, the present embodiment is not limited to the arrangement. For example, some of the touch sensor regions R1 can be omitted as appropriate.

The present invention is not limited to the description of the present embodiments above, but can be modified by a skilled person in the art within the scope of the claims. An embodiment derived from a proper combination of technical means disclosed in respective different embodiments is also encompassed in the technical scope of the present invention.

INDUSTRIAL APPLICABILITY

The present invention makes it possible to carry out accurate position detection without deteriorating display quality, even while a dark image is being displayed. Accordingly, the present invention is suitable for use in applications in which a clear display and accurate position detection of a touch are required.

The invention claimed is:

1. A touch-sensor-provided liquid crystal display device comprising:
   a liquid crystal display panel including a plurality of photo sensors for detecting a touched position; and
   a backlight unit provided on a backside of the liquid crystal display panel,
   the backlight unit emitting light at least part of which serves as light dedicated to sensing which is used for the detection of the touched position by the plurality of photo sensors, and
   the light dedicated to sensing traveling out from the liquid crystal display panel in a direction different from a direction toward a main viewer of the liquid crystal display panel.

2. The touch-sensor-provided liquid crystal display device as set forth in claim 1, wherein:
   the liquid crystal display panel includes a first substrate and a second substrate which face each other, the first substrate and the second substrate being provided with respective light-shielding layers for controlling a direction in which the light dedicated to sensing travels; and
   the light dedicated to sensing which is originally emitted from the backlight unit is not shielded by the light-shielding layers, and subsequently passes through the liquid crystal display panel so as to travel out from the liquid crystal display panel in the direction different from the direction toward the main viewer of the liquid crystal display panel.

3. The touch-sensor-provided liquid crystal display device as set forth in claim 2, wherein:
   the light-shielding layers, which are provided in the first substrate and the second substrate, respectively have slits which are openings provided in the light-shielding layers, the slits not overlapping each other as seen from a normal direction with respect to the liquid crystal display panel; and
   the light dedicated to sensing which is originally emitted by the backlight unit passes through the slits provided in the light-shielding layers, and subsequently passes through the liquid crystal display panel so as to travel out from the liquid crystal display panel in the direction different from the direction toward the main viewer of the liquid crystal display panel.

4. The touch-sensor-provided liquid crystal display device as set forth in claim 1, wherein:
   the liquid crystal display panel includes (i) a first substrate which is provided on a display surface side of the liquid crystal display panel and (ii) a second substrate which is provided on a side of the liquid crystal display panel on which side the backlight unit is provided, the first substrate and the second substrate being provided so as to face each other, and at least the first substrate being provided with a parallax barrier which has a striped shape and controls light emitted from the liquid crystal display panel to travel in two or more arbitrary directions; and
   the light dedicated to sensing is at least one of light beams traveling in the two or more arbitrary directions.

5. The touch-sensor-provided liquid crystal display device as set forth in claim 4, wherein:
   the liquid crystal display panel is a dual view liquid crystal display panel.

6. The touch-sensor-provided liquid crystal display device as set forth in claim 1, wherein:
   the light dedicated to sensing is being emitted while the liquid crystal display panel is displaying an image.

* * * * *